July 6, 1943.                K. F. MOLLER                2,323,834
                            MACHINE TOOL
                        Filed Nov. 13, 1940            2 Sheets-Sheet 1
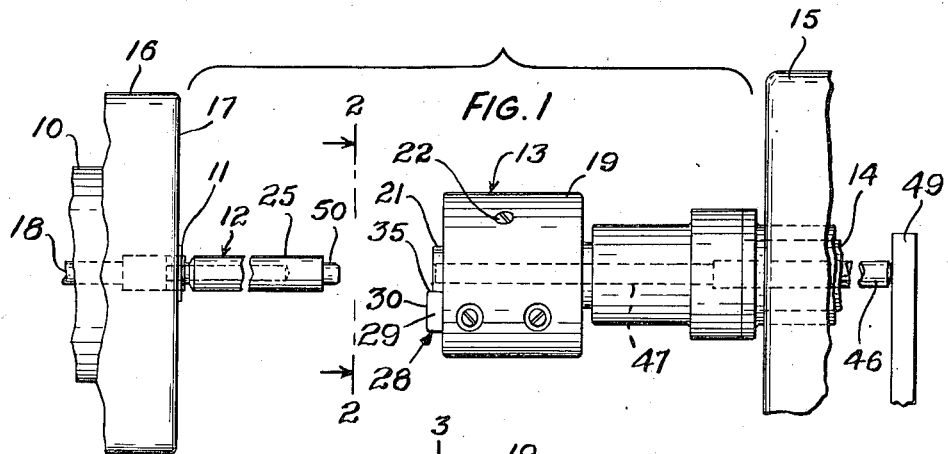
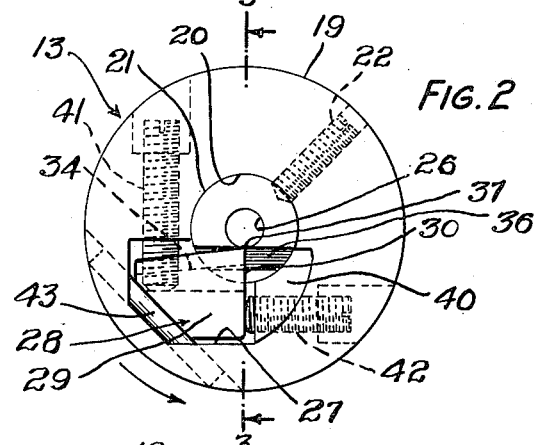
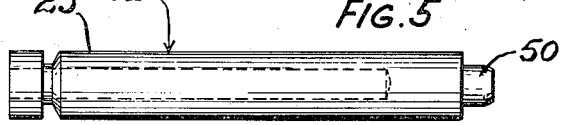
INVENTOR
K. F. MOLLER
BY Emery Robinson
ATTORNEY July 6, 1943.　　　　K. F. MOLLER　　　　2,323,834
MACHINE TOOL
Filed Nov. 13, 1940　　　　2 Sheets-Sheet 2
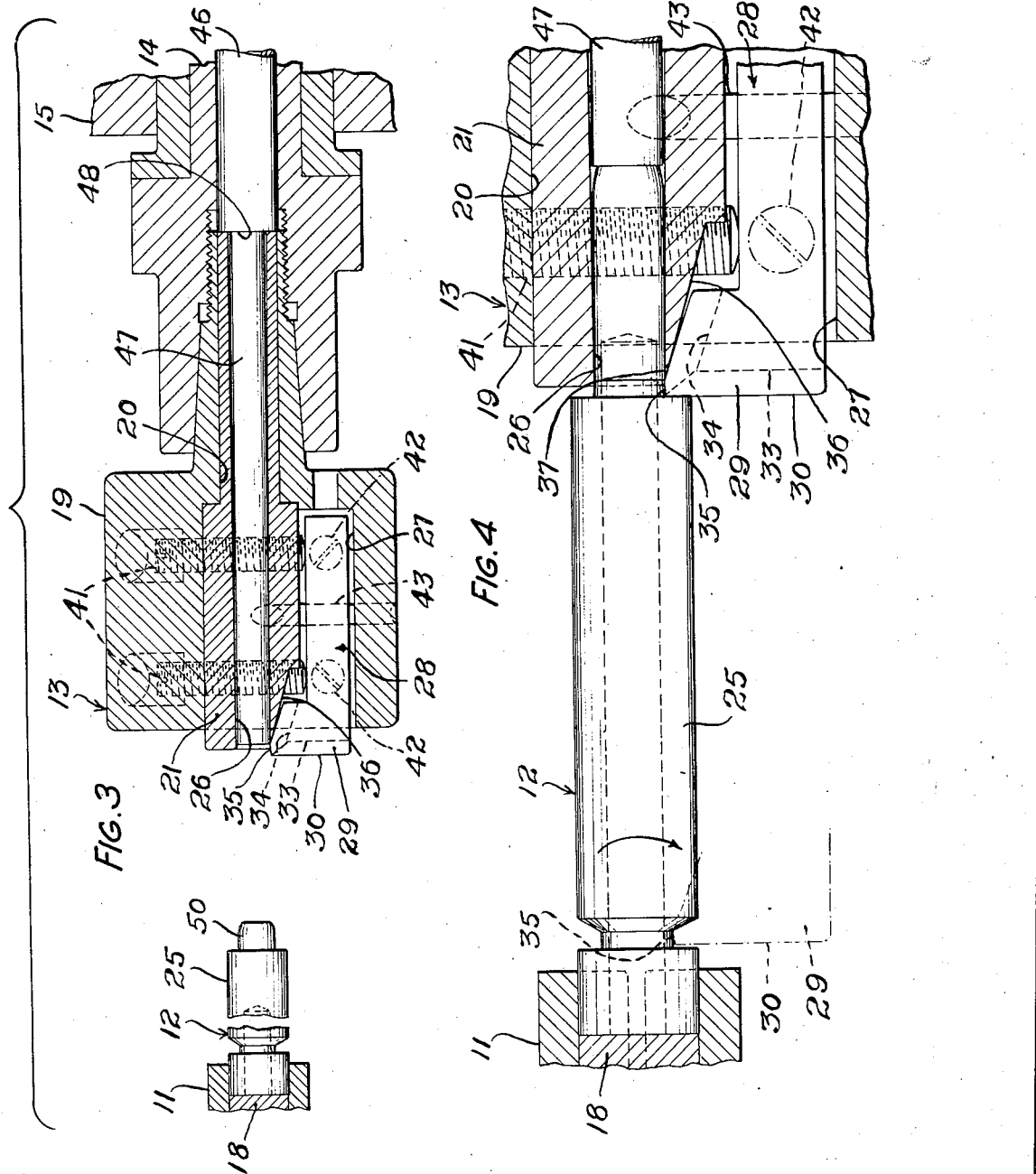
INVENTOR
K. F. MOLLER
BY Emery Robinson
ATTORNEY Patented July 6, 1943

2,323,834

UNITED STATES PATENT OFFICE 2,323,834

MACHINE TOOL

Kasper F. Moller, Chicago, Ill., assignor to Western Electric Company, Incorporated, New York, N. Y., a corporation of New York Application November 13, 1940, Serial No. 365,441

4 Claims. (Cl. 82—35)

This invention relates to machine tools and more particularly to turning tools for automatic screw machines.

This invention has been found particularly useful in the production of small shell-like articles, for example, an article such as a contact ring connection for a telephone switchboard plug, which comprises an integral longitudinally apertured member having a thin walled relatively long shank portion with a wall at one end and an enlarged open head at its opposite end, the outside diameter of the finished shank portion being only .020" larger than the inside diameter of the aperture.

To produce articles of this type in an efficient and practical manner it is desirable to first form the aperture in a cylindrical blank having an outside diameter throughout its length the same as the head of the finished article. Simultaneously with the forming of the aperture the blank is turned down at the inner end of the head and at the opposite end of the blank for suitable distances to coincide with the desired outside diameter of the shank portion in order to facilitate the turning of the blank to its desired diameter in a succeeding operation, thus leaving a .010" thick wall at the head. In the succeeding operation with which the turning tool of this invention is concerned the blank is gripped at its head by a rotating chuck and since a large amount of material is removed during the turning down of the relatively long shank portion there is a pronounced tendency of the blank to bend, due to the releasing of stresses set up in the manufacture of the raw material. Therefore, in turning down the shank portion it is necessary to provide means for supporting the shank portion as it is turned down and throughout the entire length thereof to counteract this bending tendency and reduce the same to a minimum. Also, the torque resistance of the shank portion at the inner end of the head, previously reduced in diameter, is only slightly in excess of the torque produced thereon by the turning tool. Any additional torque, created either from friction between the supporting means and the shank portion or by the wedging of chips therebetween as well as between the tool and the supporting means increases the probability of the shank portion breaking off at the head during the turning operation.

An object of this invention is to provide an improved turning tool whereby articles of the above described general type may be efficiently and accurately turned down with a minimum of deleterious friction and torque being added during the turning operation, tending to bend or break the article.

In accordance with the above object, in one embodiment of the invention, particularly designed for turning down articles of the above type and as applied to a conventional automatic screw machine, there is provided a rotary and reciprocatory turning tool comprising a hollow holder carrying a tool blade which is moved into operative relation with and along a rotatable blank to be turned down. Within the holder is a bushing having an aperture throughout its length for receiving, guiding and supporting the turned down portion of the blank, the diameter of the aperture at its extreme forward end substantially coinciding with the diameter of the turned down blank and being slightly tapered towards its rear end to reduce friction and thereby deleterious torque on the turned portion. The arrangement is such that the blank is fully guided and supported at the forward end of the bushing where the cutting edge of the tool blade is located and consequently throughout the entire turning operation. Thus, any tendency of the thin walled portion of the blank to bend or break is reduced to a minimum. A knockout or cleanout rod is arranged within the aperture of the bushing which serves to eject any broken parts and chips at each return movement of the tool by the engagement of the rear end of the rod with a stationary stop member, the rod being moved back into the bushing during the advance of the tool by the turned down portion of the blank as it enters the bushing. The bushing is cut away at a suitable angle at its forward end to accommodate the tool blade carried by the holder, the blade being fitted closely to this angle which tangents the turned diameter closely behind the cutting edge of the blade which extends slightly ahead of the bushing. This arrangement minimizes any tendency of chips getting wedged between the tool blade and the bushing which would cause additional torque on the turned portion of the blank. Means is provided for adjusting the tool blade to accurately position the cutting edge thereof.

Other objects and advantages of this invention will more fully appear from the following detailed description taken in conjunction with the accompanying drawings, in which Fig. 1 is a side view of a turning tool embodying the features of this invention as applied to a conventional automatic screw machine, shown fragmentarily;

Fig. 2 is an enlarged forward end view of the turning tool, taken on the line 2—2 of Fig. 1;

Fig. 3 is a vertical longitudinal section of the turning tool taken on the line 3—3 of Fig. 2 and showing fragmentarily the automatic screw machine, the tool being shown in its retracted position relative to the work piece;

Fig. 4 is an enlarged fragmentary view of Fig. 3, the tool being shown in an advanced position and the work piece partially turned down, and Figs. 5 and 6 are side views of the work piece before and after, respectively, being worked by the turning tool of this invention.

Referring now to the drawings and more particularly to Figs. 1, 3, and 4, one embodiment of this invention is shown applied, for example, to a conventional automatic screw machine, shown fragmentarily, employing a single work piece rotating spindle, indicated at 10, to which is attached a chuck 11 in which is gripped a work piece 12, the spindle and chuck being continuously rotated. A rotary turning tool is indicated in general at 13 which is carried by and constantly driven by a hollow spindle 14. The tool spindle 14 is mounted on a tool slide 15 which is advanced periodically to carry the tool 13 into operative cutting relation with the forward end of the rotating work piece 12 and as the slide continues its advance the tool turns down the work piece, which is rotating about a fixed axis, to the desired diameter. The spindle 14 during its reciprocatory movements with the tool slide 15 is continuously rotated and in order to increase the cutting speed the work piece and tool carrying spindles 10 and 14, respectively, are driven at high speeds in opposite directions. The work piece spindle 10 is suitably journaled in a bearing (not shown) enclosed in a stationary housing 16 (Fig. 1), the chuck freely rotating in an opening in an end wall 17 of the housing and extending a short distance outside thereof.

By mechanisms well known in the art the chuck 11 is periodically actuated, the work piece and tool carrying spindles 10 and 14, respectively, are continuously rotated and the tool slide 15 carrying the continuously rotating tool spindle 14 with the tool 13 is periodically advanced toward and along the continuously rotating work piece 12 held by the chuck 11 and upon completion of the turning operation is retracted. Also in timed relation to the reciprocatory movements of the tool 13 the partially formed work piece 12 to be turned down is loaded into the chuck 11 either manually or automatically, from a supply magazine (not shown) and a completely turned work piece is automatically ejected from the chuck by an ejector rod 18 (Fig. 1) all in a manner well known in the art and constituting no part of this invention.

The details of the above referred to mechanisms and elements have been omitted from the present application for the sake of simplicity, since a full disclosure of the particular construction of the various driving and actuating mechanisms is not essential to a complete understanding of this invention.

The turning tool 13 comprises a cylindrical longitudinally bored tool blade holder 19 having a tapered and threaded shank for concentric attachment to the outer end of the hollow driving spindle 14 (Fig. 3). Mounted within a shouldered bore or aperture 20 of the holder 19 is a shouldered bushing 21 having its inner end aligned with the inner end of the holder shank, the bushing being secured to the holder for rotation therewith by a set screw 22 (Fig. 2). The bushing 21 which receives, guides and supports a relatively long shank portion 25 of the work piece 12 during the turning operation is provided with an aperture 26 which has a diameter at its extreme forward end coinciding with the turned down diameter of the shank portion 25. Thus, the work piece is firmly and continuously supported at the point where it is being turned down. The aperture 26 is slightly outwardly tapered towards its rear end to reduce friction between the bushing and the workpiece, which are rotating in opposite directions.

Formed longitudinally in the holder 19 below the axis of its aperture 20, as viewed in Figs. 2 and 3, is an irregularly shaped aperture 27 within which is carried a tungsten carbide turning tool blade 28 provided with a suitably shaped cutting head 29 having a cutting edge 30 predeterminedly located slightly ahead of the outer end face of the bushing 21 and right angularly aligned with the longitudinal axis of the bushing. The vertical forward end face of the blade 28 (Fig. 2) as well as its top face from the point where they join at the cutting edge 30 are sloped at suitable angles, as indicated by dotted lines at 33 and 34, respectively (Figs. 3 and 4) to provide clearance for the cutting edge.

The top face of the blade head 29, where it joins the forward end face at the cutting edge 30 thereof, is sloped slightly upwardly, as indicated at 35 (Figs. 3 and 4), to provide a "drag" which extends from the cutting edge to a point slightly inside the aperture 26 in the bushing 21 to provide clearance and a high polish on the work piece. From the high point of the sloping face 35 the top face of the blade head 29 is also sloped, for clearance purposes, at a suitable angle to the axis of the bushing aperture 26 and the bushing is cut away at substantially the same angle, as indicated at 36. The blade head 29 is fitted closely to the latter angle and consequently tangents the turned diameter of the work piece shank portion 25 closely behind the cutting edge 30 of the blade 28. The angle of the face 36 on the bushing 21 results in a slight cutting away, as indicated at 37 (Fig. 4), of the inner peripheral wall of the aperture 26 in the bushing at its outer end sufficient only for the entrance of the sloping "drag" face 35 (Figs. 3 and 4) at the upper end of the cutting edge 30 of the blade 28. The fit of the blade head 29 relative to the sloping face 36 of the bushing 21 and the cutaway portion at 37 is such that chips are prevented from getting wedged between the blade head 29 and the bushing 21, thus preventing deleterious torque being added during the turning operation. At its forward end face the tool blade holder 19 is recessed, as indicated at 40 (Fig. 2), to insure that the cut material or chips may freely pass outwardly from the cutting blade.

The tool blade 28 is adjustably held in a fixed position in the aperture 27 of the holder 19 by two sets of adjusting screws 41 and 42 arranged 90° to each other, the screws being threaded through apertures in the holder and bearing against upper and right side faces of the tool blade, as viewed in Fig. 2. The left side of the tool blade 28 is held by the screws 41 and 42 against a stationary pin 43 of circular cross section inserted in the holder 19 and extending through the aperture 27, the pin being arranged at 45° to the screws and intermediate each pair thereof (Fig. 3). It will be apparent that by variously adjusting the screws 41 and 42, the position of the cutting edge 30 of the blade 28 may be microscopically varied in two directions to accurately position the cutting edge 30 and "drag" face 35 of the blade relative to the diameter of the aperture 26 in the bushing 21, the blade being rockable on the pin.

Slidably carried in the hollow tool spindle 14 is a shouldered knockout or cleanout rod 46 having a reduced forward end portion 47, which, in its normal position as shown in Fig. 3, extends almost through the tapered aperture 26 of the bushing 21. The diameter of the end portion 47 is the same as the diameter of the extreme forward end of the bushing aperture 26 and an annular shouldered surface 48 of the rod in its normal position abuts the annular rear end surface of the bushing to limit its movement in one direction. In the normal position of the rod 46 (Fig. 1) its rear end abuts a stationary stop member 49 mounted on the frame (not shown) of the screw machine. In the operation of the machine, as the slide 15 carries the tool 13 toward the left, the turned down portion of the work piece 12 enters the bushing 21, engages the forward end of the rod 46, and moves it back into the bushing. During the retraction of the tool 13 the rear end of the rod 46 engages the stationary stop member 49 and advances the rod to its normal position, as shown in Figs. 1 and 3 and during this advance, it serves to clean out the bushing 21 of chips and if a broken piece part is left in the bushing it will be ejected.

In the operation of the above type of screw machine equipped with the described embodiment of turning tool, it will be assumed that the machine is in operation and at the particular period in its operating cycle, as shown in Figs. 1 and 3, the work piece 12 has just been loaded into the rotating chuck 11. In timed relation with the loading of the chuck 11 the tool slide 15 is advanced to carry the tool blade 28 of the rotating turning tool 13 into operative cutting relation with the rotating work piece 12 and a reduced end 50 thereof, previously turned down, enters the bushing aperture 26, pushing the cleanout rod 46 ahead of it and continuing to do so as the turning operation progresses (Fig. 4). Thus, the work piece 12 is rigidly supported by the bushing in advance of the actual cutting by the tool blade 28, as well as during the cutting operation. As will be noted by the broken line position of the tool blade head 29 in Fig. 4, which represents the extreme advance movement of the tool blade cutting edge 30 along the shank portion 25 of the work piece 12, the cutting edge does not engage the previously finished annular end face of the head portion of the work piece. During the retraction of the tool slide 15 the rear end of the cleanout rod 46 abuts the stop member 49 and returns the rod to its normal position in the bushing 21, during which it acts to clean out the bushing of chips or broken piece parts, as hereinbefore described.

It will be obvious that while the features of this invention are disclosed and described in connection with a screw machine, wherein the work is rotated at a fixed position and the rotating tool is advanced to the work, it is also applicable to a machine in which rotating work is advanced to a tool rotating at a fixed position. Further, it is not limited as disclosed to a machine in which the work as well as the tool are rotated, since in some cases it might be desirable to rotate only one or the other. In the case of the work advancing to the tool a compression spring operatively associated with the cleanout rod 46 would serve to return the rod to its normal position after the work was removed from the bushing 21.

From the above description, it is believed to be clear that an improved turning tool is provided by the use of which thin walled shell-like articles may be efficiently and accurately produced with a minimum of deleterious friction and torque being added during the turning operation, tending to bend or break the article. As the turning operation progresses the article at all times is fully supported at the forward end of the bushing 21 where the cutting occurs to resist the thrust of the tool blade 28 upon the article while the turned down portion of the article is advanced into the outwardly tapered bushing aperture 26 out of contact with the peripheral wall of the aperture which minimizes friction between the rotating work piece and bushing.

It will be understood that the embodiment herein illustrated and described is merely illustrative of the invention, which is limited only by the terms of the appended claims.

What is claimed is:

1. In an article cutting or turning mechanism, reciprocatory means carried thereby having an aperture for receiving and supporting a rotary article as the cutting thereof progresses, the diameter of said aperture at its forward end substantially coinciding with that of the turned down portion of the article and tapering outwardly toward its rear end to reduce friction, a cutting blade associated with said means having a cutting edge positioned slightly beyond the forward end of said aperture and extending at an angle to the longitudinal axis thereof and terminating at its inner end slightly within said aperture, a cleanout rod slidably carried in said aperture and movable toward the rear end thereof by the article as it is received therein during an advance of said reciprocatory means, and a stationary stop member against which said rod abuts effective during a retraction of said reciprocatory means for returning said rod as said article is withdrawn from said aperture.

2. In an article cutting or turning mechanism a reciprocatory tool slide, a hollow rotary tool spindle carried thereby, a rotary chuck for holding an article coaxially aligned with said spindle, means for rotating said chuck and spindle in opposite directions and reciprocating said tool slide, means concentrically attached to one end of said spindle, said means having an aperture for receiving and supporting the article as the cutting thereof progresses, the diameter of said aperture at its forward end substantially coinciding with that of the turned down portion of the article and tapering outwardly toward its rear end to reduce friction, a cutting blade associated with said means having a cutting edge positioned slightly beyond the forward end of said aperture and extending at an angle to the axis thereof and terminating at its inner end slightly within said aperture, a cleanout rod slidably carried in said aperture and movable toward the rear end thereof by the article as it is received therein during an advance of said tool slide, and a stationary stop member against which said rod abuts effective during a retraction of said tool slide for returning said rod as said article is withdrawn from said aperture.

3. In an article cutting or turning mechanism, reciprocatory means carried thereby having an aperture for receiving and supporting a rotary article as the cutting thereof progresses, a cutting blade associated therewith having a cutting edge positioned at the forward end of and slightly within said aperture, cleanout means slidably carried in said aperture and movable toward the rear end thereof by the article as it is received therein during an advance of said reciprocatory means, and an abutment in the path of and engaged by said means during a retraction of said reciprocatory means for returning said cleanout means as said article is withdrawn from said aperture.

4. In an article cutting or turning mechanism, a reciprocatory tool slide, a hollow rotary tool spindle carried thereby, a rotary chuck for holding an article coaxially aligned with said spindle, means for rotating said chuck and spindle in opposite directions and reciprocating said tool slide, means concentrically attached to one end of said spindle, said means having an aperture for receiving and supporting the article as the cutting thereof progresses, a cutting blade associated with said means having a cutting edge positioned at the forward end of and slightly within said aperture, a cleanout rod slidably carried in said aperture and movable toward the rear end thereof by the article as it is received therein during an advance of said tool slide, and a stationary stop member against which said rod abuts effective during a retraction of said tool slide for returning said rod as said article is withdrawn from said aperture.

KASPER F. MOLLER.